United States Patent

[11] 3,622,207

| [72] | Inventor | Thomas H. Engle |
| | | Cape Vincent, N.Y. |
| [21] | Appl. No. | 49,851 |
| [22] | Filed | June 25, 1970 |
| [45] | Patented | Nov. 23, 1971 |
| [73] | Assignee | General Signal Corporation |

[54] HYDRAULIC TRANSLATING AND VALVING UNIT
6 Claims, 2 Drawing Figs.

[52] U.S. Cl. .................................................... 303/13,
303/75, 303/89
[51] Int. Cl. ..................................................... B60t 7/10,
B60t 17/16
[50] Field of Search .......................................... 91/41, 44,
45; 137/115, 118; 188/265; 303/1, 2, 10, 13, 61,
68, 75, 89

[56] References Cited
UNITED STATES PATENTS
3,508,794  4/1970  Engle ........................... 303/10

*Primary Examiner*—Milton Buchler
*Assistant Examiner*—Stephen G. Kunin
*Attorney*—Dodge & Ostmann ABSTRACT: The disclosure concerns hydraulic translating and valving mechanisms particularly suited for use on railway cars to join a single set of hydraulically operated brake cylinders with both handbrake and service brake circuits. Each mechanism affords slack-compensating action to the handbrake, allows either brake to be cycled regardless of whether the other is applied or released, and prevents unintentional release of a handbrake application as a result of operation of the service brake circuit.

INVENTOR
THOMAS H. ENGLE
BY Dodge & Ostmann
ATTORNEYS

INVENTOR
THOMAS H. ENGLE

HYDRAULIC TRANSLATING AND VALVING UNIT

BACKGROUND AND SUMMARY OF THE INVENTION

U.S. Pat. No. 3,508,794, granted Apr. 28, 1970, relates to hydraulic braking systems for railway cars and discloses several systems in which a single set of brake cylinders on a car serves both the handbrake circuit and the service brake circuit. In the preferred system of this kind, the two braking circuits are joined to the brake cylinders through the translating and valving unit illustrated in FIG. 16. Testing of this system under actual service conditions has uncovered the following undesirable characteristics, which are described using the reference numerals employed in the patent:

1. If the handbrake is released while a service brake application is in effect, the pressure in translator space 70c will shift piston assembly 70b to the extreme left-hand position. When the service brake is subsequently released, the air-to-hydraulic booster in that brake circuit will create a partial vacuum in space 70c, and atmospheric pressure acting on the oil in translator space 70a may shift piston assembly 70b to the right. If the piston assembly moves far enough to close shutoff valve 83, the booster will be prevented from withdrawing the proper volume of oil from the brake cylinders. As a result, the brakeshoes will drag on the wheels.
2. As just indicated, if the airbrake is cycled (i.e., applied and released) while the handbrake is released, piston assembly 70b may end up in a position at or near the right end of its cylinder. If the airbrake is then applied again, the pressure in translator space 70c will move piston assembly 70b to the left very rapidly and expel oil from space 70a to the reservoir. The restriction to flow through this return path from space 70a to the reservoir is such that a back pressure sufficient to apply the brake cylinder locks may be developed in the locking motors. As a result, the brakeshoes could be locked against the wheels while the train is moving.
3. When the handbrake is applied and then released, the pressure in the brake cylinders acts on the nose of shutoff valve 83 and is intended to be effective to supplement spring 84 and effect opening of this valve, and then to act in translator space 70c to shift piston 70b back to its retracted position. However, it has been found that slight motion of the shutoff valve is sufficient to relieve the pressure in the brake cylinders and in the connecting pipes, and that assembly 70b does not fully retract. Because of this, positive control over shoe clearance is precluded. Moreover, in some cases, O-ring 83a is blown from its groove in rod 70k during a handbrake release and is wedged between this rod and the wall of bore 83b during the next handbrake application. This condition not only causes rapid deterioration of the O-ring but can also prevent retraction of the piston assembly when the hand brake is subsequently released. As a result, the shoes will drag on the wheels.

The object of this invention is to provide an improved hydraulic translating and valving mechanism which eliminates the difficulties just mentioned while retaining all of the desirable features of the prior mechanism of U.S. Pat. No. 3,508,794. According to this invention, the new translating and valving device incorporates a retraction spring for the piston assembly, and a shutoff valve which is interposed between the service brake connection and one of the translator working spaces and which includes the piston assembly itself and a set of ports in the wall of the translator cylinder. The retraction spring prevents movement of the piston assembly under the partial vacuum conditions created by the air-to-hydraulic booster of the service brake, and thereby eliminates inherently the first two undesirable characteristics of the prior device. The relocation of the shutoff valve allows its sealing function to be performed by the packings of the piston assembly. Since these elements continuously engage a cylinder wall of uniform diameter, valve wear is minimized and binding is avoided. Because of this, the retraction spring is rendered effective to cause the piston assembly to positively withdraw the required quantity of oil from the brake cylinders during handbrake releases. Thus, the combination of the retraction spring and the new shutoff valve eliminates the third disadvantage of the earlier translating and valving unit.

As in the case of the earlier device, the improved translating and valving unit serves as a hydraulic slack adjuster for the handbrake, so it includes a check valve controlled bypass path around the translator piston. However, since the translator piston in the new design is equipped with a return spring, the bypass scheme must be designed to prohibit flow between the translator working spaces until a considerably higher differential between the pressures in these spaces is developed. Although this requirement can be satisfied using a simple check valve, by merely providing it with a stiffer biasing spring, that approach inherently increases the effort which the crewman must exert in order to fully apply the handbrake. Therefore, it is a further purpose of the invention to provide an improved check valve scheme for the bypass arrangement which eliminates this disadvantage.

BRIEF DESCRIPTION OF THE DRAWINGS

Two embodiments of the invention are described herein in detail with reference to the accompanying drawings in which.

DESCRIPTION OF THE FIG. 1 EMBODIMENT

Figure 1:
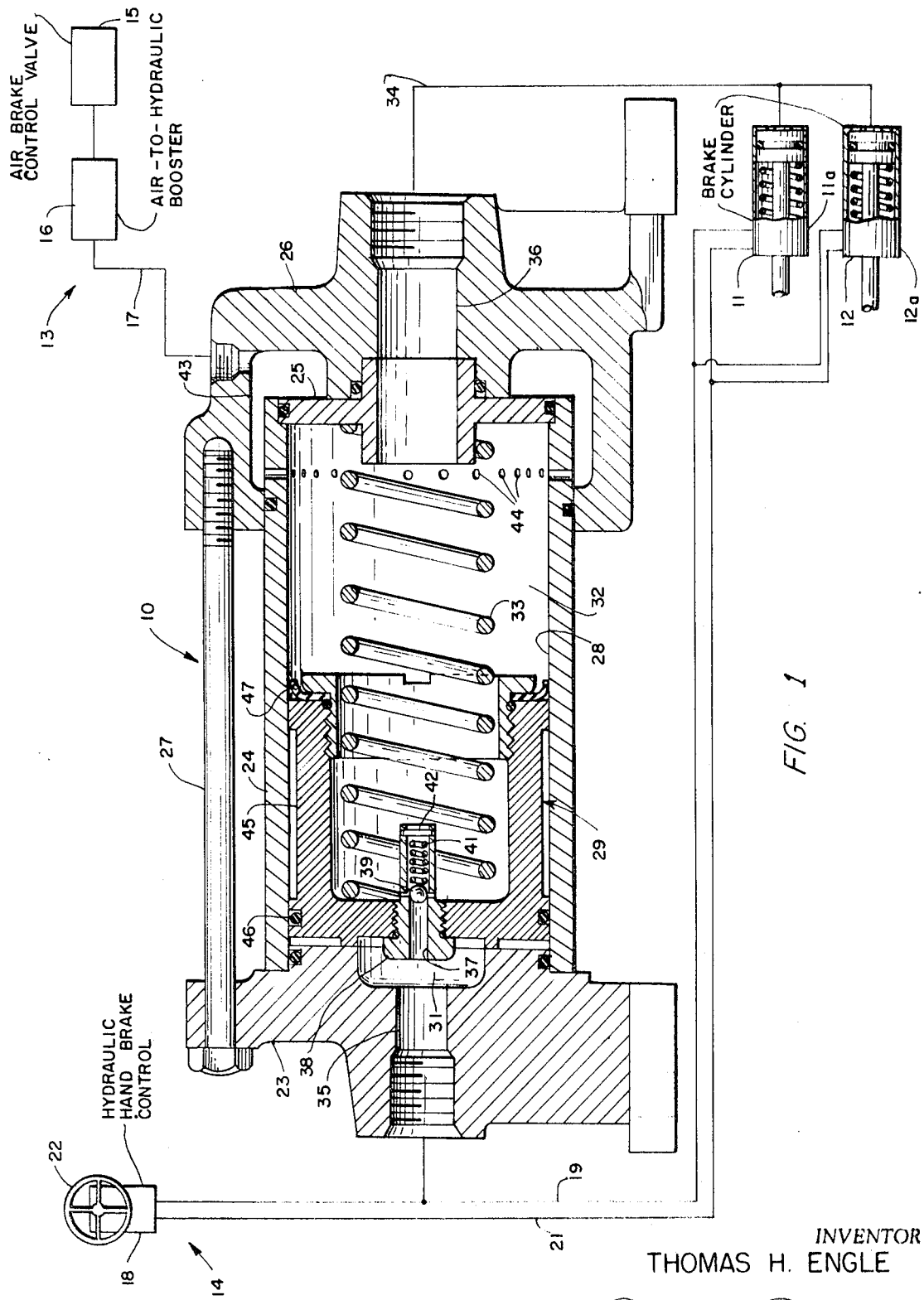
FIG. 1 is a schematic diagram of a combined handbrake-service brake system employing one version of the improved translating and valving unit.

As shown in FIG. 1, the improved translating and valving unit 10 is employed in a hydraulic braking system to join the car's parallel-connected brake cylinders 11 and 12 with both a service brake circuit 13 and a handbrake circuit 14. The cylinders 11 and 12 may include return springs, as shown, or the brake rigging may be designed so that retraction of the shoes is effected by gravitational forces. The service brake includes a conventional airbrake control valve 15 and an air-to-hydraulic booster 16 which transduces the pneumatic output of valve 15 and produces in pipe 17 a proportional, but higher, hydraulic pressure. Preferably, booster 16 takes the form of the preferred embodiment disclosed in application Ser. No. 812,551, filed Mar. 17, 1969 now U.S. Pat. No. 3,513,656. Handbrake circuit 14, which is the one shown in FIG. 1 OF U.S. Pat. No. 3,508,794, includes a control station 18, a hydraulically operated lock mechanism 11a or 12a associated with each brake cylinder, and a pair of pipes 19 and 21. Pipe 19 leads directly to the hydraulic locking motors in mechanisms 11a and 12a and indirectly to the working spaces of brake cylinders 11 and 12 through translating and valving unit 10, whereas pipe 21 leads to the hydraulic unlocking motors in mechanisms 11a and 12a. The handbrake is operated by a handwheel 22 which, when rotated in the clockwise direction, causes station 18 to deliver fluid under pressure to pipe 19 and to vent pipe 21 to an oil reservoir. This action effects pressurization of the brake cylinders and sets the cylinder locks. On the other hand, when handwheel 22 is rotated in the counterclockwise direction, station 18 delivers fluid under pressure to pipe 21 and vents pipe 19. This action effects unlocking of the cylinder locks and retraction of the brake cylinders.

The improved unit 10 comprises a casing including separable sections 23-26 which are held together in assembled relation by tie bolts 27, and which enclose a pressure translating cylinder 28. This cylinder is of uniform diameter and contains a reciprocable piston 29 which divides it into two working spaces 31 and 32. The piston is biased to the left into engagement with end section 23 by a coil compression spring 33. The spaces 31 and 32 are connected in continuous communication with handbrake pipe 19 and brake cylinder pipe 34, respectively, by passages 35 and 36 formed in end sections 23 and 26, and they are connected with each other through a bypass passage 37 formed in an insert 38 threaded into piston 29. This passage contains a check valve 39 oriented to block flow from space 32 and equipped with a biasing spring 41 seated on a transverse pin 42 pressed into insert 38. The spring is selected to preclude flow from space 31 to space 32 until the differential between the pressures in the spaces exceeds the differential required to shift piston 29 to the limit of its travel in the rightward direction. In a typical case, a 30-p.s.i. differential is needed to overpower return spring 33 and force piston 29 into abutment with casing section 25, and a 60-p.s.i. differential is needed to open valve 39 against the opposition of spring 41.

Translator working space 32 also is connected with booster outlet pipe 17 via a cored chamber 43 in end section 26 and a shutoff valve comprising piston 29 and a series of radial ports 44 extending through casing section 24. The shutoff valve normally is open and is closed only during the terminal portion of the rightward movement of piston 29. When the piston overtravels ports 44 and causes the latter to register with the groove 45 located in its periphery between the elastic seals 46 and 47, flow from space 32 to pipe 17 and the booster is prevented. However, since the right-hand seal 47 is in the form of a flexible cup packing which bears resiliently against cylinder 28 and is installed to block flow only from space 32, it serves as a check valve and allows flow from chamber 43 to space 32. Therefore, booster 16 will not be precluded from delivering fluid to the brake cylinders 1 and 12 when the shutoff valve is closed.

As explained in application Ser. No. 812,551, now U.S. Pat. No. 3,513,656, the discharge stroke of booster 16 consists of an initial low-pressure stage in which the amount of oil displaced per inch of stroke is relatively large, and a second or high-pressure stage in which the displacement per inch of stroke is much smaller. Since, as will be evident from the following description of operation, unit 10 can impose a flow demand on booster 16 when the latter is in its high-pressure stage and is serving to maintain a selected pressure in the brake cylinders, it is essential that the second stage discharge capacity of the booster be greater than the capacity of unit 10. In a typical practical system, the second stage capacity of booster 16 is equal to the first stage capacity and is about twice the volume swept by translator piston 29 as the latter moves between its limiting positions. With this arrangement, the brakeshoe clearance established by unit 10 after cycling of the handbrake necessarily will be smaller than the clearance established by booster 16 after cycling of the airbrake. However, this is no real disadvantage if the booster is sized to create the desired running shoe clearance because railroad regulations require that the service brake be cycled before the train leaves a yard, and that operation will inherently create the desired shoe clearance.

When the FIG. 1 system is in service the improved translating an valving unit 10 operates in the following manner:

A. If a handbrake application is initiated while the airbrake is released, the oil delivered to pip 19 from station 18 will flow into translator space 31 and shift piston 29 to the right. This movement of the piston displaces oil from space 32 and causes it to flow through passage 36 and pipe 34 to the brake cylinders 11 and 12. Because of the relative capacities of unit 10 and booster 16, the quantity of oil displaced from space 32 usually will not be sufficient to enable cylinders 11 and 12 to take up existing brakeshoe clearance. Therefore, although shutoff valve 29,44 is open throughout almost the entire stroke of piston 29, the pressure in space 32 will be below the setting of the relief valve in booster 16 and none of the oil displaced from this space will escape to the reservoir through that valve. After piston 29 reaches the end of its stroke and closes ports 44, further rotation of handwheel 22 will increase the differential between the pressures in spaces 31 and 32 sufficiently to cause check valve 39 to open. Now, the additional oil needed to fully set the brakes can flow directly from pipe 19 to brake cylinders 11 and 12 through bypass passage 37.

Sometimes, for example, when the handbrake is cycled several times in succession, or shoe clearance is reduced drastically as the result of shoe replacement effected just prior to the handbrake application, shoe clearance takeup will be completed before translator piston 29 reaches the limit of its stroke. In these cases, some oil will escape to the reservoir through the relief valve in booster 16 after the shoes are brought into engagement with the wheels and brake cylinder pressure commences to rise. This action allows piston 29 to advance to its limiting position and close ports 44. Thereafter, rotation of handwheel 22 will cause check valve 39 to open and allow the small additional volume of oil needed to raise braking pressure to the proper level to flow from pipe 19 to the brake cylinders through bypass passage 37.

Inasmuch as the locking motors in the cylinder locking mechanisms 11a and 12a are in continuous communication with handbrake pipe 19, it will be evident that the locks will be rendered effective to hold the shoes in application position at the final setting of the handbrake.

When release of the handbrake is initiated, control station 18 delivers oil under pressure to pipe 21, to thereby effect release of the lock mechanisms 11a and 12a, and simultaneously vents pipe 19 to the reservoir. Spring 33 now returns piston 29 to the illustrated position, thereby causing it to open the shutoff valve and to create a partial vacuum in space 32. As a result, oil is transferred from brake cylinders 11 and 12 to that space, and the brakeshoes are allowed to retract from the wheels. During this operation, the oil displaced from space 31 is returned to the reservoir through pipe 19 and control station 18. The amount of oil withdrawn from the brake cylinders, and consequently the shoe clearance which is established, depends upon the stroke of piston 29 since once the piston reaches the limit of its leftward movement flow into space 32 ceases. Therefore, it will be evident that a predetermined shoe clearance automatically is established whenever a handbrake application is released.

b. If an airbrake application is initiated while the handbrake is released, piston 29 will be in the illustrated retracted position, and shutoff valve 29,44 will be open. Consequently, oil delivered to pipe 17 by booster 16 will flow to the brake cylinders 11 and 12 through chamber 43, ports 44, space 32, passage 36 and pipe 34. Sine bypass check valve 39 and the piston seals 46 and 47 preclude flow from space 32 to space 31, it follows that the airbrake application will not pressurize handbrake pipe 19 and activates the cylinder locks 11a and 12a.

When the airbrake is released, booster 16 will withdraw oil from the brake cylinders 11 and 12 through pipe 34, passage 36, space 32, port 44, chamber 43 and pipe 17 and allow the brakeshoes to retract. During the release, the booster 16 will create a partial vacuum in space 32, but, because of the presence of spring 33, the atmospheric pressure prevailing in space 31 will not be able to shift piston 29 to the right and effect closure of shutoff valve 29,44.

c. If a handbrake application is initiated while an airbrake application is in effect, space 32 will be under the selected service braking pressure; therefore, if the service brake pressure is high, rotation of handwheel may merely apply the cylinder locks 11a and 12a and never produce in line 19 the pressure required to shift translator piston 29. In other words, the handbrake may merely lock the brake cylinder at the preexisting braking level established by the airbrake. In most cases, however, the pressure in pipe 19 will be raised to a level higher than that established by the airbrake, and translator piston 29 will shift to the right. Since the shoes are already in contact with the wheels, the oil displaced from space 32 will not flow to the cylinders 11 and 12, but will be transferred back to the booster 16 through shutoff valve 29,44, chamber 43 and pipe 17. This transfer of oil will continue until piston 29 overtravels and closes ports 44. The oil returned to booster 16 causes its piston to retract against the opposition of the air motor which responds to the output of control valve 15.

If shutoff valve 29,44 was not closed during the handbrake application, subsequent release of the airbrake application will enable booster 16 to withdraw oil from space 32 and brake cylinders 11 and 12 and reduce the pressure in the brake cylinders to a very low level. This, however, has no adverse effect because the cylinder locks are set and will hold the preexisting braking force. On the other hand, if the shutoff valve was closed during the handbrake application, the brake cylinders 11 and 12 will remain pressurized, and booster 16 will merely retract slightly and relieve the pressure in chamber 43 and in pipe 17. And, as in the previous case, the cylinder locks 11a an 12a will remain in locking position until the handbrake is released.

d. If an airbrake application is initiated while a handbrake application is in effect, shutoff valve 29,44 will be closed, and ports 44 will be in communication with the peripheral groove 45 in piston 29. In the event the output pressure of booster 16 is less than the prevailing pressure in space 32 and the connected brake cylinders 11 and 12, there will be no flow to the brake cylinders. On the other hand, if booster output pressure is higher than brake cylinder pressure, oil in groove 45 will flow across packing 47 into space 32 and from there to the brake cylinders. As a result, brake cylinder pressure will be raised to the level of the booster output. During the course of this operation, piston 29 will be moved to the left until the pressures in spaces 31 and 32 equalize. This movement may or may not reopen shutoff valve 29,44.

If, after the airbrake is applied, the handbrake is released, booster 16 will deliver sufficient additional oil to space 32 to maintain the pressure in the brake cylinders at the selected level while spring 33 moves piston 29 back to the illustrated retracted position. The oil displaced from space 31 during this movement of piston 29 is returned to the reservoir through control station 18. Since release of the handbrake entails unlocking of the cylinder locks 11a and 12a, it will be evident that a subsequent release of the airbrake will result in retraction of the brakeshoes.

DESCRIPTION OF THE FIG. 2 EMBODIMENT

As mentioned earlier, the closing bias on the bypass check valve 39 in FIG. 1 is sized to insure that this valve will stay closed until the differential between the pressures in chambers 31 and 32 exceeds the level required to move piston 29 into abutment with casing section 25. Since the back pressure produced by valve 39 is substantial, and is reflected as a sudden increase in the resistance to movement of handwheel 22, an inexperienced crewman may misinterpret the facts and conclude that the brakes are fully set when, in reality, piston 29 merely has reached the limit of its stroke. This risk can be minimized by using the check valve arrangement shown in FIG. 2.

Figure 2:
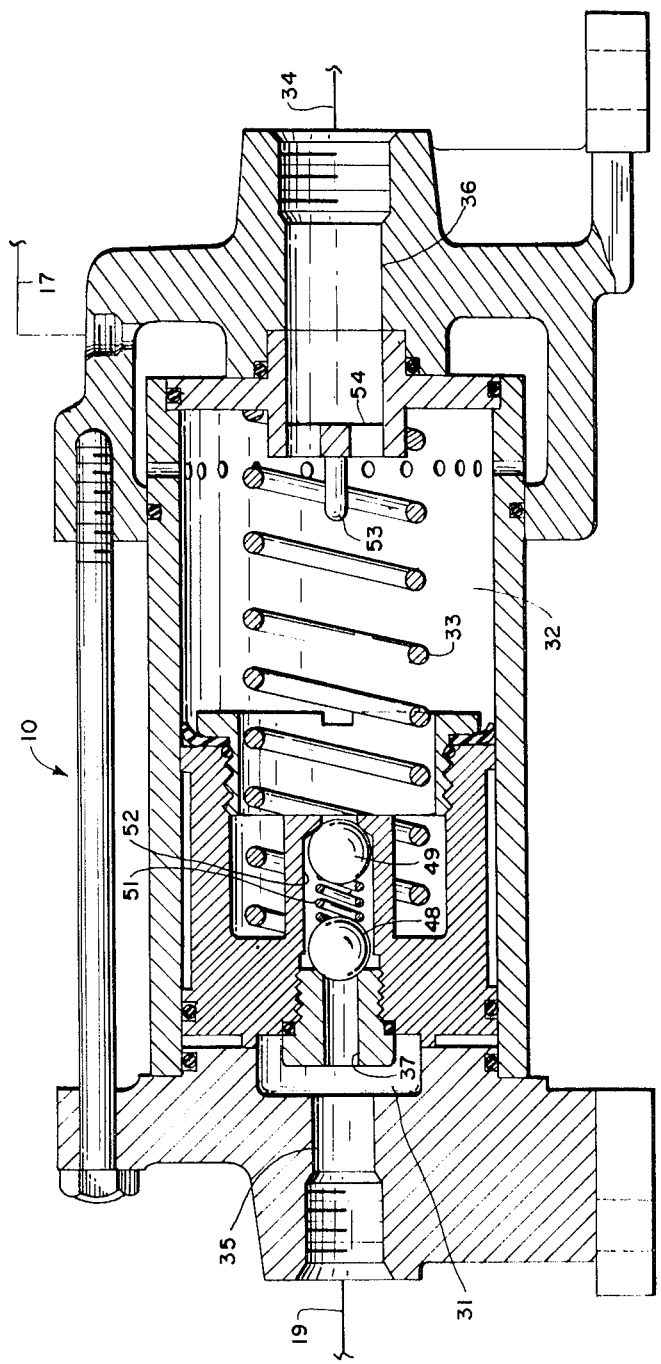
FIG. 2 is a sectional view of a second version of the invention incorporating an improved check valve scheme for the bypass path.

In the FIG. 2 embodiment, the bypass passage 37 interconnecting translator spaces 31 and 32 is provided with a pair of reversely set check valves 48 and 49 which are connected in series flow relation and are biased closed by a common, light compression spring 51. The left-hand check valve 48 is opened by the differential between the pressures in space 31 and an intermediate portion 52 of bypass passage 37, and the other check valve 49 is arranged to be opened mechanically by a pin 53 carried by a spider number 54 fixed in passage 36. Valve 49 also is pressure responsive and can be opened by a small differential between the pressures in space 32 and passage portion 52, but this incidental effect is of no consequence because check valve 48 always prevents flow through passage 37 from space 32 to space 31. Pin 53 is designed to open valve 49 after translator piston 29 has overtraveled and closed ports 44; therefore, the magnitude of the pressure differential needed to open check valve 48 need not be related to the biasing force of return spring 33 and can be quite small. Because of this, the pressure differential required to produce flow through bypass passage 37 can be only slightly greater than that needed to move piston 29 through its full stroke.

The translating and valving unit 10 of FIG. 2 performs the same functions and operates in essentially the same way as its FIG. 1 counterpart, except that the essential functions performed by valve 39, namely the prevention of premature flow through the bypass passage during handbrake applications, and the absolute prevention of reverse flow, are assigned to the separate valves 48 and 49.

What is claimed is:

1. Hydraulic translating and valving mechanism for use in joining a brake cylinder with service and hand brake circuits and comprising
   a. a cylinder (28) containing a reciprocable piston (29) which divides it into two working spaces (31,32) and has equal and opposed reaction areas subject to the pressures in said spaces;
   b. a bypass passage (37) interconnecting the working spaces and containing check valves means (39,41 or 48,49,53) for blocking flow from the second (32) to the first (31) space but permitting flow in the reverse direction upon the development of a predetermined differential between the pressures in said spaces;
   c. spring means (33) biasing the piston (20) in the direction of the first working space (31);
   d. first and second fluid transfer passages (35,36) adapted to connect the handbrake circuit and the brake cylinder in continuous communication with the first and second working spaces, respectively;
   e. a third fluid transfer passage (43) adapted to connect the service brake circuit with the second working space (32) through a shutoff valve (29,44) which is normally open but is closed by the piston (29) when the latter reaches a predetermined point in its travel toward the second working space (32); and
   f. means, including a check valve (47), for allowing flow from the third fluid transfer passage (43) to the second such passage (36) when the shutoff valve (29,44) is closed.

2. The mechanism defined in claim 1 in which the shutoff valve comprises a circumferential series of ports (44) opening into the second working space (32) through a wall of the cylinder (28) and which are positioned to be overtraveled and thereby closed by the piston (29).

3. The mechanism defined in claim 1 in which
   a. the bypass passage (37) extends longitudinally through the piston (29); and
   b. the check valve means is a ball-type check valve (39) in the piston (29) and provided with a biasing spring (41) which holds it closed at differentials between the pressures in said spaces (31,32) below that required to move the piston (29) to the position in which it closes the shutoff valve (29,44).

4. The mechanism defined in claim 1 in which the check valve means comprises
   a. a pair of reversely set check valves (48,49) arranged in series in the bypass passage (37),
   b. the check valve (48) located nearer the first working space (31) being adapted to open at a pressure differential materially smaller than said predetermined differential, and
   c. the other check valve (49) being arranged to be opened by a stationary mechanical actuator (53) after the piston (29) reaches said predetermined point in its travel toward the second space (32).

5. The mechanism defined in claim 4 in which
   a. both check valves (48,49) are of the ball type; and
   b. these check valves (48,49) are biased closed by a common spring (51) located between them.
6. The mechanism defined in claim 2 in which
   a. the piston (29) is provided with a pair of longitudinally spaced, resilient sealing members (46,47) which engage the cylinder (28) around its entire circumference and thereby inhibit leakage from either of said spaces (31,32) to the other space across the piston;
   b. said series of ports (44) registers with a clearance space (45) between the piston and the cylinder located between said sealing members when the shutoff valve is closed; and
   c. at least the sealing member (47) disposed adjacent the second working space (32) is a flexible packing which bears against the cylinder and permits flow from the clearance space (45) to said second working space (32) but precludes flow in the reverse direction,
   d. whereby the ports (44), the clearance space (45), the flexible packing (47) and the second working space (32) constitute said means for allowing flow from the third (43) to the second (36) fluid transfer passage when the shutoff valve is closed.

* * * * *